US008737182B1

(12) United States Patent
Dekker

(10) Patent No.: US 8,737,182 B1
(45) Date of Patent: May 27, 2014

(54) METHOD AND APPARATUS FOR MEASURING ECCENTRICITY IN ROTATION OF A DISC IN A DISC DRIVE SYSTEM

(71) Applicant: Marvell International Ltd., Hamilton (BM)

(72) Inventor: Antonius Leonardus Dekker, Eindhoven (NL)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/671,091

(22) Filed: Nov. 7, 2012

Related U.S. Application Data

(63) Continuation of application No. 61/557,304, filed on Nov. 8, 2011.

(51) Int. Cl.
*G11B 7/00* (2006.01)
(52) U.S. Cl.
USPC ............... 369/47.44; 369/47.49; 369/53.23; 369/47.14; 369/44.32

(58) Field of Classification Search
None
See application file for complete search history.

(56) References Cited

U.S. PATENT DOCUMENTS

| 6,738,327 | B2 * | 5/2004 | Tateishi et al. | 369/47.26 |
| 7,196,979 | B2 * | 3/2007 | Kadlec et al. | 369/44.27 |
| 7,876,654 | B2 * | 1/2011 | Tada | 369/47.49 |
| 2003/0081512 | A1 * | 5/2003 | Itoh et al. | 369/30.16 |
| 2012/0051199 | A1 * | 3/2012 | Onoe | 369/47.44 |

* cited by examiner

*Primary Examiner* — Van Chow

(57) ABSTRACT

Some of the embodiments of the present disclosure provide a method for operating a disc drive system, the method comprising based at least in part on a first injector signal, oscillating a focusing apparatus of the disc drive system; while oscillating the focusing apparatus of the disc drive system and rotating a disc placed within the disc drive system, estimating an amplitude of a track crossing speed signal; generating a second injector signal having a frequency that is substantially the same as a frequency of the first injector signal; and based at least in part on the estimated amplitude of the track crossing speed signal and the second injector signal, estimating a sign of the track crossing speed signal.

19 Claims, 10 Drawing Sheets

METHOD AND APPARATUS FOR MEASURING ECCENTRICITY IN ROTATION OF A DISC IN A DISC DRIVE SYSTEM

CROSS REFERENCE TO RELATED APPLICATIONS

The present disclosure claims priority to U.S. Provisional Patent Application No. 61/557,304, filed on Nov. 8, 2011, which is incorporated herein by reference in its entirety.

TECHNICAL FIELD

Embodiments of the present disclosure relate to a disc drive system, and more specifically, to measuring eccentricity in rotation of a disc in a disc drive system.

BACKGROUND

Unless otherwise indicated herein, the approaches described in this section are not prior art to the claims in the present disclosure and are not admitted to be prior art by inclusion in this section.

Optical disc drive systems are widely used for reading from and/or writing to an optical disc (e.g., a compact disc (CD disc), a digital versatile disc (DVD), a Blue Ray disc, etc.). An optical disc is generally placed on a turntable of an optical disc drive system, and the turntable rotates the optical disc while the optical disc is being read from or written to. A light beam, which passes through a lens of the optical disc drive system, generally performs a read or a write operation of the optical disc. If the optical disc is not placed perfectly concentrically with the turntable of the optical disc drive system, the optical disc may rotate (e.g., while a read and/or a write operation is performed) in an eccentric manner with respect to the turntable.

In a conventional optical disc drive system, an amplitude and a phase of an eccentricity of an optical disc may be estimated, for example, using a track error signal and a signal (e.g., a sum signal) from a diode detector in an optical pick up unit of the optical disc drive system. For example, the track error signal (e.g., which may be a sinusoidal signal) and the signal from the diode detector (e.g., which may be a cosine signal) are usually out of phase, and the phase difference between these two signals may be used to estimate a phase of the eccentricity of the optical disc. However, a modulation of the signal from the diode detector may be low, and the signal from the diode detector may be easily affected by, for example, scratches, birefringence or finger prints in the optical disc. Accordingly, estimating the phase of the eccentricity in the conventional optical disc drive system, using the track error signal and the signal from the diode detector, may be prone to errors.

SUMMARY

Some of the embodiments of the present disclosure provide a method for operating a disc drive system, the method comprising based at least in part on a first injector signal, oscillating a focusing apparatus of the disc drive system; while oscillating the focusing apparatus of the disc drive system and rotating a disc placed within the disc drive system, estimating an amplitude of a track crossing speed signal; generating a second injector signal having a frequency that is substantially the same as a frequency of the first injector signal; and based at least in part on the estimated amplitude of the track crossing speed signal and the second injector signal, estimating a sign of the track crossing speed signal.

Some of the embodiments of the present disclosure also provide a controller of a disc drive system, the controller comprising a position control module configured to oscillate a focusing apparatus of the disc drive system, based at least in part on a first injector signal; and an eccentricity measurement module comprising: a speed determination module configured to estimate an amplitude of a track crossing speed signal while the focusing apparatus is being oscillated and a disc placed within the disc drive system is being rotated, and an injector signal generation module configured to generate the first injector signal and a second injector signal, wherein the second injector signal has a frequency that is substantially the same as a frequency of the first injector signal, wherein the eccentricity measurement module is configured to, based at least in part on the estimated amplitude of the track crossing speed signal and the second injector signal, estimate a sign of the track crossing speed signal.

Some of the embodiments of the present disclosure also provide a disc drive system comprising a focusing apparatus; a position control module configured to oscillate the focusing apparatus of the disc drive system, based at least in part on a first injector signal; and an eccentricity measurement module comprising: a speed determination module configured to estimate an amplitude of a track crossing speed signal while the focusing apparatus is being oscillated and a disc placed within the disc drive system is being rotated, an injector signal generation module configured to generate the first injector signal and a second injector signal, wherein the second injector signal has a frequency that is substantially the same as a frequency of the first injector signal, and a multiplication module configured to: receive a processed version of the amplitude of the track crossing speed signal and the second injector signal, and generate a multiplication signal that is indicative of a sign of the track crossing speed signal.

BRIEF DESCRIPTION OF THE DRAWINGS

In the following detailed description, reference is made to the accompanying drawings which form a part hereof wherein like numerals designate like parts throughout, and in which is shown by way of embodiments that illustrate principles of the present disclosure. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

FIG. 2A illustrates an optical disc.

DETAILED DESCRIPTION

Figure 1A:
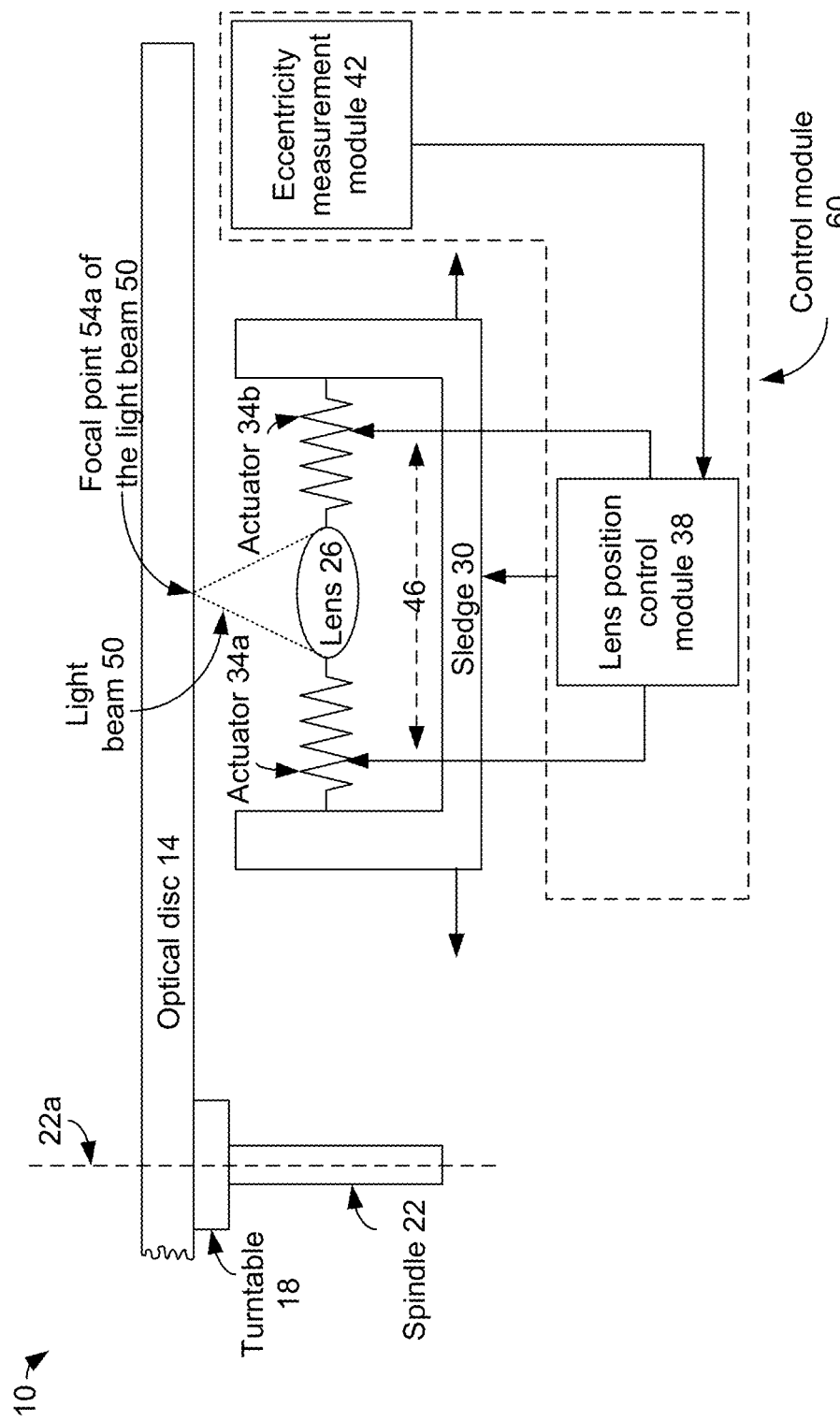
FIGS. 1A-1C schematically illustrate an optical disc drive system.

FIG. 1A schematically illustrates an optical disc drive system 10 (henceforth referred to as "system 10"). The system 10 is, for example, configured to store information on or read information from an optical disc 14 (e.g., a CD disc, a DVD disc, a Blue Ray disc, etc.). In FIG. 1A, only a portion of the optical disc 14 is illustrated. In an embodiment, the system 10 is incorporated in any appropriate electronic device, e.g., a computer, a laptop, a desk top, a CD player, a DVD player, a Blue Ray disc player, an audio and/or video system, a consumer electronic device, and/or an appropriate system that is configured to read to and/or write from an optical disc.

Although FIG. 1A illustrates an optical disc 14 and some of the embodiments discussed herein are associated with the optical disc drive system 10, the teachings of this disclosure are not limited to merely optical discs. For example, the teachings of this disclosure may be applied to any other disc media (e.g., a magnetic disc, a hard disc, or the like) and/or any other disc drive system.

The system 10 comprises a turntable 18, and the optical disc 14 is placed on the turntable 18. A spindle 22 is coupled to the turntable 18. The spindle 22 selectively rotates the turntable 18 and the optical disc 14 (e.g., when data is to be read from, or written to the optical disc 14). Although not illustrated in FIG. 1A, in an example, the spindle 22 is coupled to a spindle motor, and the spindle motor rotates the spindle 22. An axis 22a of the spindle 22 is illustrated in FIG. 1A, where the axis 22a passes vertically through a central point of the spindle 22. The axis 22a forms an axis of rotation (i.e., a center of rotation) of the optical disc 14 when the optical disc 14 is rotated by the turntable 18.

The system 10 further comprises a focusing apparatus, e.g., a lens 26 (although any other focusing apparatus may be used, e.g., in case the disc 14 is a magnetic disc (e.g., a hard disc), an appropriate read/write head can also be used). The lens 26 is a part of an optical system for scanning optical tracks of the optical disc 14 by an optical beam. Although not illustrated in FIG. 1A, the optical system includes, apart from the lens 26, several other components, e.g., a light beam generation module (e.g., comprising a laser diode) configured to generate a light beam that passes through the lens 26 and is focused on the optical disc 14, an optical detector which receives light reflected by the optical disc 14 and generates a read signal, and/or the like. For example, a light beam 50 (illustrated using dotted lines in FIG. 1A) is focused by the lens 26 onto the optical disc 14 (e.g., for reading from or writing to the optical disc 14), such that a focal point 54a of the light beam 50 is formed on the optical disc 14.

The system 10 further comprises a displaceable sledge 30. In an embodiment, the sledge 30 is displaceably guided in a radial direction of the optical disc 14. For example, the sledge 30 is guided (e.g., the sledge 30 moves) in one of the two example directions illustrated in FIG. 1A. Although not illustrated in FIG. 1A, the sledge 30 is moved, for example, by a sledge motor.

The system 10 further comprises lens actuators (henceforth referred to as "actuators") 34a and 34b. The lens 26 is coupled to the sledge 30 (e.g., mounted on the sledge 30) via the actuators 34a and 34b. The actuators 34a and 34b constitute radial couplings between the lens 26 and the sledge 30. The actuators 34a and 34b have characteristics of elasticity, stiffness, damping and/or the like. Although FIG. 1A illustrates the actuators 34a and 34b in the form of two spring elements, the actuators 34a and 34b may comprise any appropriate components (e.g., springs, dampers, and/or any other compression and elongation elements).

Figure 1B:
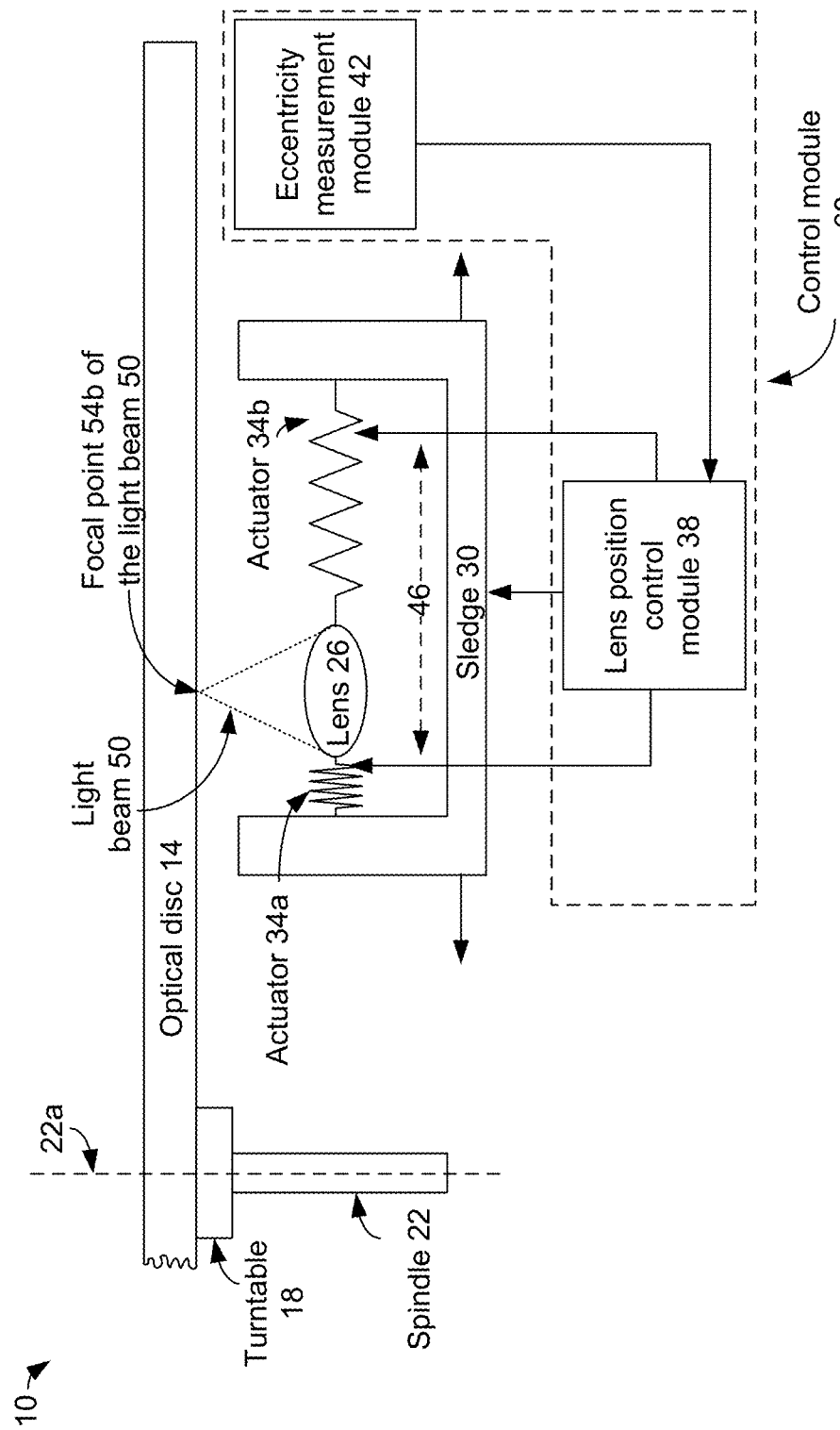

The actuators 34a and 34b are used to move the lens 26 in the radial direction of the optical disc 14 (e.g., to move the lens 26 with respect to the sledge 30). For example, a range of movement of the lens 26 (i.e., a distance range in which the lens 26 can move), by selectively actuating or activating the actuators 34a and 34b, is illustrated as 46 is FIG. 1A. As an example, the actuators 34a and 34b can be activated in a specific manner (e.g., the actuator 34a can be compressed and the actuator 34b can be elongated) to move the lens 26 towards the center of the optical disc 14, as illustrated in FIG. 1B. In another example, the actuators 34a and 34b can be activated in another specific manner (e.g., the actuator 34b can be compressed and the actuator 34a can be elongated) to move the lens 26 towards the periphery of the optical disc 14, as illustrated in FIG. 1C.

In an embodiment, the sledge 30 is used for coarse positioning of the lens 26, and the actuators 34a and 34b are used for finer positioning of the lens 26. For example, when the actuators 34a and 34b are not activated, the lens 26 is at a neutral position. The neutral position of the lens 26 is defined by a position of the sledge 30. For example, the neutral position of the lens 26 can be changed by moving the sledge 30 in the radial direction of the optical disc 14. For example, while in the neutral position, a center point of the lens 26 substantially coincides with a center point of the sledge 30. FIG. 1A illustrates the lens 26 at the neutral position of the lens 26, while FIGS. 1B and 1C illustrate the lens 26 being deviated (e.g., by selectively activating the actuators 34a and 34b) from the neutral position of the lens 26.

In addition to adjusting the neutral position of the lens 26 (e.g., by adjusting the position of the sledge 30), an operating position of the lens 26 can be changed by selectively activating the actuators 34a and 34b. The operating position of the lens 26 refers to the actual position of the lens 26. For example, when none of the actuators 34a and 34b are actuated, the neutral position of the lens 26 coincides with the operating position of the lens 26, as illustrated in FIG. 1A. However, when the actuators 34a and 34b are activated, the neutral position of the lens 26 may not coincide with the operating position of the lens 26, as illustrated in FIGS. 1B and 1C.

Figure 1C:
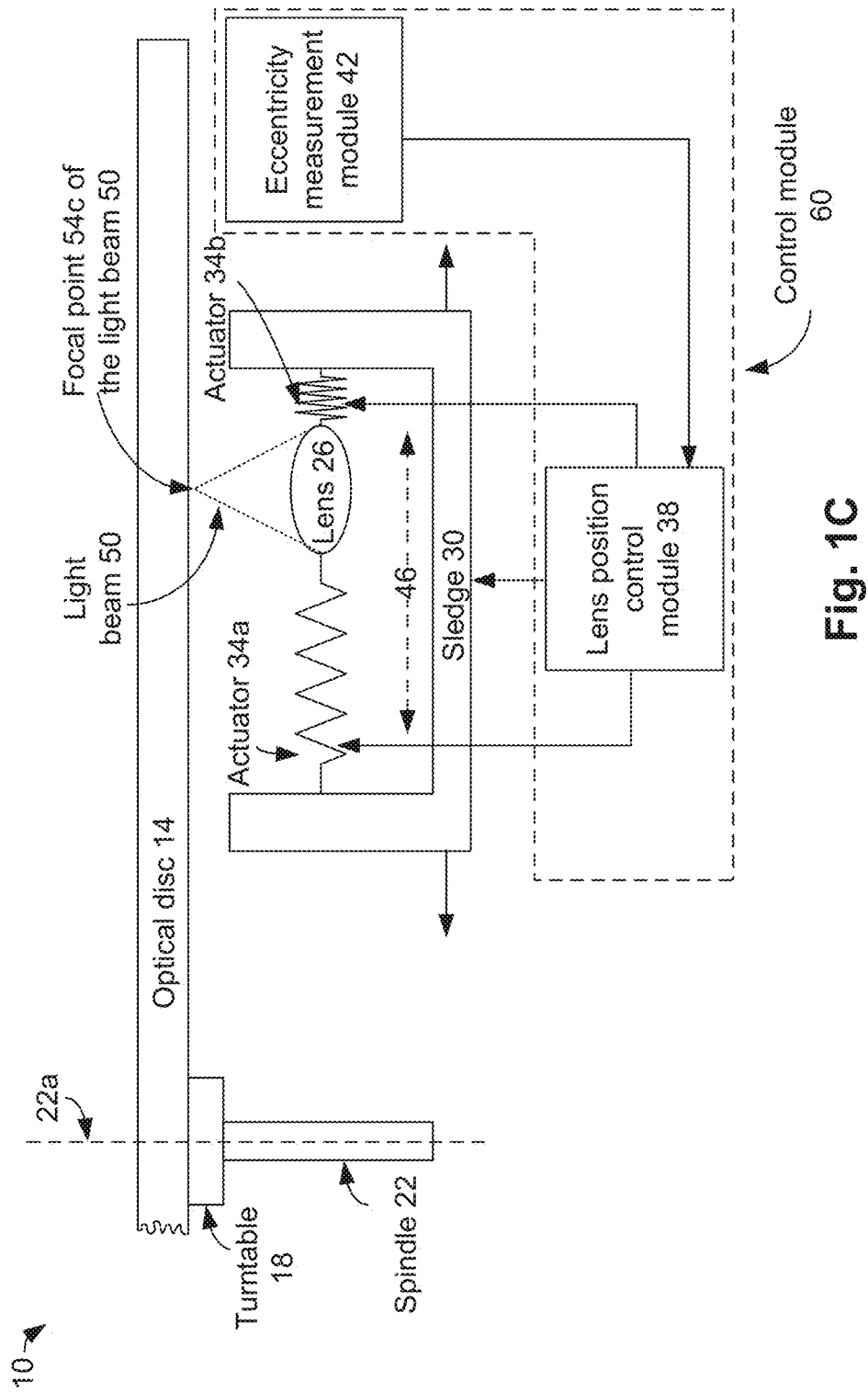

In an embodiment, moving the lens 26 moves the focal point of the light beam 50 on the optical disc 14, as illustrated in FIGS. 1A, 1B and 1C. For example, FIGS. 1A, 1B and 1C respectively illustrate different focal points 54a, 54b and 54c of the light beam 50 on the optical disc 14.

Although FIG. 1A illustrates specific types of sledge and actuators of the system 10, the scope of this disclosure is not limited by any specific type or design of the sledge and the actuators. In an embodiment and although not illustrated in FIG. 1A, a different type or design of the sledge and/or the actuator (e.g., different from the sledge 30 and/or the actuators 34a and 34b of FIG. 1A) can be used in the system 10 to appropriately position the lens 26.

In an embodiment, the system 10 further comprises a lens position control module 38 configured to position the lens 26 by, for example, appropriately moving the sledge 30 and/or activating the actuators 34a and 34b. For example, the lens position control module 38 controls a sledge motor to move the sledge 30, thereby controlling the neutral position of the lens 26 (i.e., the position of the lens 26, without the actuators 34a and 34b being activated). The lens position control module 38 also selectively activates the actuators 34a and 34b to control the actual operating position of the lens 26. FIG. 1A illustrates example control inputs from the lens position control module 38 to the sledge 30 and the actuators 34a and 34b, for selectively activating the sledge 30, the actuator 34a and/or the actuator 34b.

The system 10 further comprises an eccentricity measurement module 42 configured to detect an eccentricity in a rotation of the optical disc 14 in the system 10, and measure an amplitude and phase of the eccentricity in the rotation of the optical disc 14. In an embodiment, in order to detect and measure the eccentricity, the eccentricity measurement module 42 selectively provides control input to the lens position control module 38, to enable the lens position control module 38 to selectively activate the actuators 34a and 34b (e.g., to oscillate the lens 26 in a sinusoidal motion), as will be discussed herein in detail. In an embodiment, the eccentricity measurement module 42 also provides feedback to the lens position control module 38, to enable the lens position control module 38 to appropriately position and move the lens 26 while the lens 26 tracks an optical track of the optical disc 14.

In an embodiment, the lens position control module 38 and the eccentricity measurement module 42 forms a control module 60 (illustrated using dotted lines in FIG. 1A) of the system 10 (although the control module may comprise any other appropriate elements of the system 10, e.g., a mechanism to actually move the sledge 30 and/or the actuators 34a and 34b).

FIG. 2A illustrates the optical disc 14 of FIG. 1A in more detail. The optical disc 14 comprises a plurality of optical tracks (henceforth referred to as "tracks") 208. The tracks 208 are formed, for example, in a spiral manner (although the tracks 208 may be formed, for example, as concentric circles, or in any other appropriate manner). FIG. 2A illustrates only a few tracks of the optical disc 14 for purposes of illustrative clarity. A center point of the optical disc 14 (i.e., a center point of the tracks 208) is denoted as 204a.

Referring to FIGS. 1A and 2A, when the optical disc 14 is placed on the turntable 18, the optical disc 14 may not be perfectly aligned with axis 22a of the spindle 22 (e.g., due to a user not placing the optical disc 14 exactly concentrically with the turntable 18, and/or the optical disc 14 slightly shifting with respect to the turntable 18 while being rotated by the turntable 18). In FIG. 2A, a center point of rotation of the optical disc 14 is denoted as 204b (i.e., the axis 22a passes through the center point 204b). As illustrated in FIG. 2A, the center point 204a of the optical disc 14 may not coincide with the center point 204b of rotation of the optical disc 14. That is, in such a case, the optical disc 14 rotates in an eccentric manner with respect to the axis 22a of the spindle 22. In an embodiment, a difference between the center points 204a and 204b is a measure of a maximum amplitude of eccentricity (ECC) of the rotation of the optical disc 14.

FIG. 2A also illustrates an example trajectory 214 (illustrated using bold line in FIG. 2A) of the focal point of the light beam 50, in presence of eccentricity in the rotation of the optical disc 14. The trajectory 214 is based on the position of the lens 26. For the trajectory 214, the lens 26 is fixed at an arbitrary position, and the optical disc 14 is rotated. If no eccentricity is present in the rotation of the optical disc 14, the trajectory 214 would be substantially concentric with the optical disc 14. However, in an event of eccentricity, the trajectory 214 is not concentric with the optical disc 14 (e.g., with the tracks 208 of the optical disc 14), as illustrated in FIG. 2A.

In absence of eccentricity, the trajectory 214 would follow a single track of the optical disc 14. However, due to the eccentricity in the rotation of the optical disc 14, the trajectory 214 of the focal point of the light beam 50 passes through a large number of tracks of the optical disc 14, as illustrated in FIG. 2A. Points A, . . . , J illustrate substantially center points of the optical tracks that are crossed by the trajectory 214 of the focal point of the light beam 50 during a single revolution of the optical disc 14. FIG. 2A also illustrates a line 260 that passes through the center points 204a and 204b. The points A and B are the points of the trajectory 214 where the trajectory 214 passes the line 260.

Figure 2B:
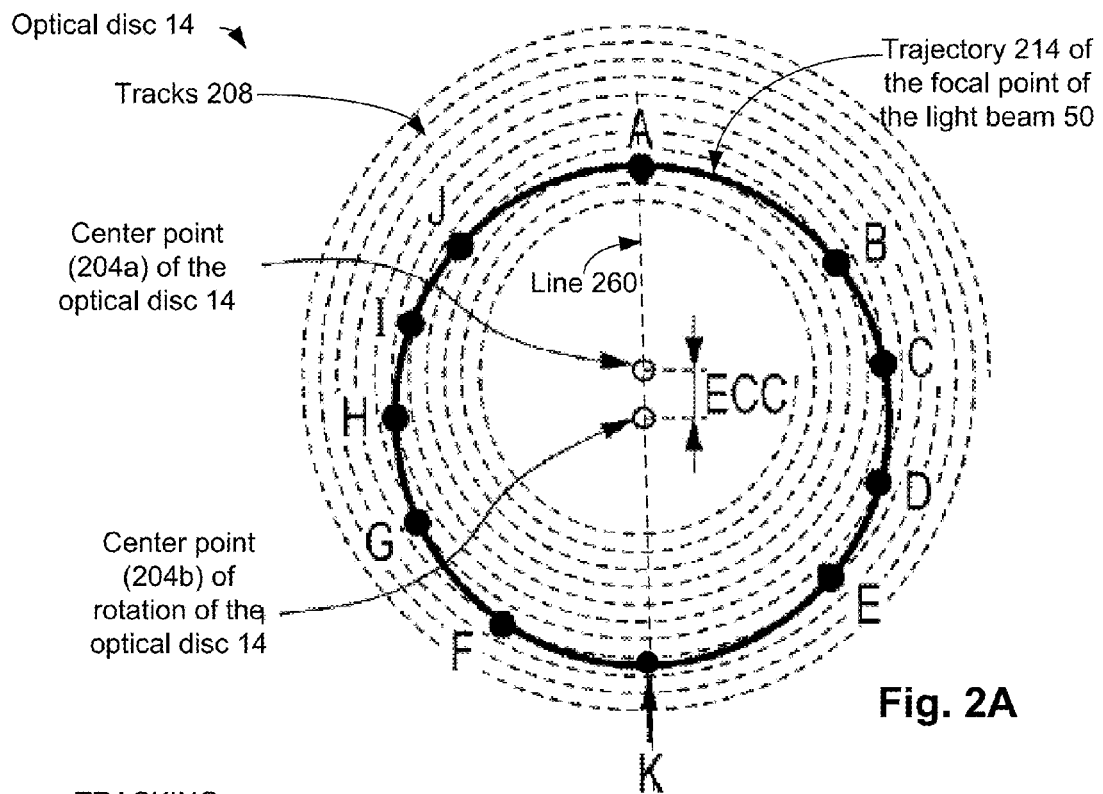
FIG. 2B illustrates various signals associated with a trajectory of a focal point of a light beam passing the tracks of the optical disc of FIG. 2A.
Figure 2B:
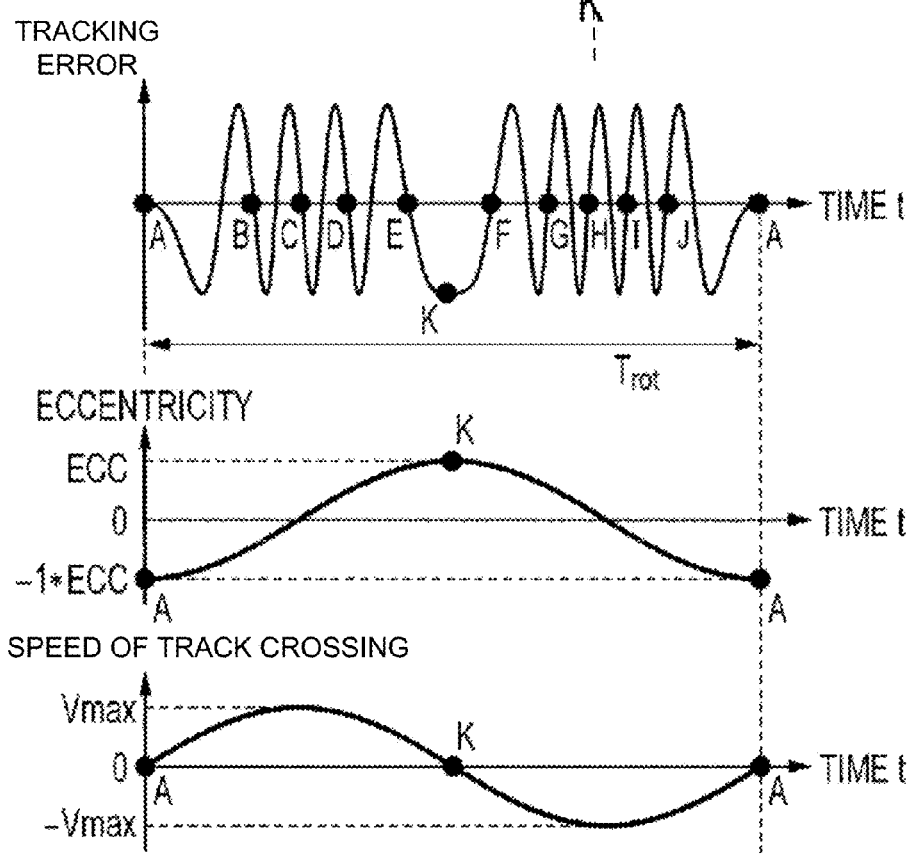

FIG. 2B illustrates a tracking error (TE) while the trajectory 214 of the focal point of the light beam 50 passes the tracks of the optical disc 14 of FIG. 2A. The TE signal, for example, indicates an error in tracking the tracks of the optical disc 14 by, for example, the lens 26 (or by another component in an optical pick up unit of the system 10). In FIG. 2B, a time duration Trot illustrates a single rotation of the optical disc 14. The TE is measured, for example, by an appropriate component of the system 10, as will be discussed herein in detail later. In an example, the TE is zero at a center of a track, and at a center point between two tracks. For example, points A, . . . , K represents center points of various tracks of the optical disc 14, which are passed over by the trajectory 214. Accordingly, as illustrated in FIG. 2B, the TE is zero at these points. Also, between, for example, points A and B, there is center point between the two tracks associated with the points A and B. Accordingly, between points A and B, the TE is zero at another point, as illustrated in FIG. 2B.

As illustrated in FIG. 2B, the TE signal repeats thin and dense for every half cycle of rotation of the optical disc 14. For example, the TE signal is relatively thin (e.g., a period of the TE signal is relatively high) at the time when the eccentricity has a minimum value (e.g., the point A) and at the time when the eccentricity has a maximum value (e.g., the point K). The TE signal is relatively dense (e.g., a period of the TE signal is relatively low), for example, at points C and I, where the eccentricity is about zero. A number of times the TE signal crosses zero in one revolution of the optical disc 14 is proportional to the eccentricity ECC.

A track crossing speed of the optical disc 14 refers to a speed with which tracks of the optical disc 14 crosses the lens 26 (i.e., crosses the focal point of the light beam 50 while the optical disc 14 is rotating), when viewed from the lens 26. Without any eccentricity and for a given position of the lens 26, the number of tracks crossing the focal point of the light beam 50 would be zero or near zero (e.g., as, without any eccentricity, the focal point of the light beam 50 would follow a single track during a revolution of the optical disc 14, thereby resulting in the number of tracks crossing the focal point of the light beam 50 to be zero or near zero).

However, due to eccentricity, for a given position of the lens 26, the focal point of the light beam 50 would cross one or more tracks during a revolution of the optical disc 14. For example, as illustrated in FIG. 2A, the points A, . . . , K are located substantially at the center of different tracks of the optical disc 14, and the trajectory 214 crosses these tracks of the optical disc 14. In an actual optical disc that includes a large number of tracks, the trajectory 214 may cross a larger number of tracks of the optical disc 14 in case of a relatively large eccentricity.

FIG. 2B illustrates (i) the speed of track crossing while the trajectory 214 of the focal point of the light beam 50 passes the tracks of the optical disc 14 of FIG. 2A, and also illustrates (ii) a measure of the eccentricity while the trajectory 214 of the focal point of the light beam 50 passes the tracks of the optical disc 14 of FIG. 2A.

For example, while at points A and K, the lens 26 views about zero track displacement while the optical disc 14 is rotating, implying zero speed of track crossing. That is, the speed of track crossing is zero at the maximum and minimum eccentricity points. In the points where eccentricity is zero, the speed of track crossing is maximum.

In an embodiment, during a given time, the speed of track crossing can be measured by taking a reciprocal of a period between the zero crossings of the TE signal at that time. For example, the speed of the track crossing is zero at the points A and K (e.g., when the period between zero crossings of the TE signal is maximum, i.e., the TE signal is thin), and reaches a peak at or near points C and I (e.g., when the period between zero crossings of the corresponding TE signal is minimum, i.e., the TE signal is thick).

As discussed, an amplitude of the speed of track crossing (henceforth also referred to as "speed signal") can be estimated from the TE signal (e.g., during a given time, the amplitude of the speed signal is based on a reciprocal of a period between the zero crossings of the TE signal at that time). However, although FIG. 2B illustrates positive and negative signs of the speed signal, in practice, such polarity of the speed signal cannot be determined solely from the TE signal. That is, the TE signal is not able to solely provide a sign or a phase of the speed signal.

Similarly, although FIG. 2B illustrates positive and negative eccentricity, in practice, such polarity of eccentricity cannot be determined solely from the TE signal. For example, an amplitude of the eccentricity signal can be determined from TE signal and/or the speed signal. However, the TE signal and/or the speed signal cannot provide a sign of the eccentricity.

In an embodiment and as will be discussed herein in more detail, the eccentricity measurement module 42 is configured to detect a magnitude and a phase of the eccentricity in the rotation of the optical disc 14.

The Eccentricity Measurement Module 42 of the System 10

Figure 3:
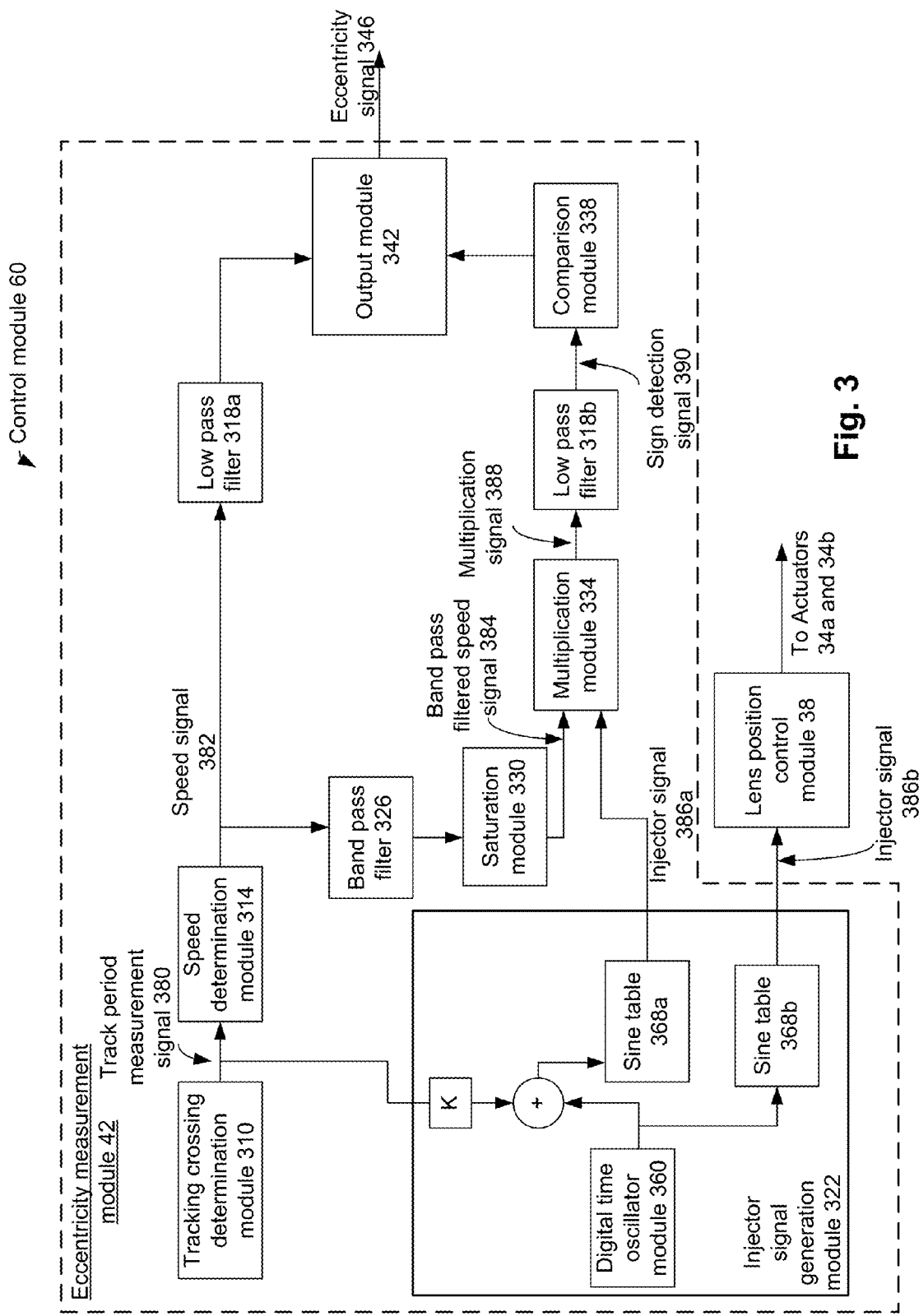
FIG. 3 illustrates an eccentricity measurement module.

FIG. 3 illustrates the eccentricity measurement module 42 of FIG. 1 in more detail. In an embodiment, the eccentricity measurement module 42 comprises a tracking crossing determination module 310 configured to (i) detect track crossing, when viewed from the lens 26, while the optical disc 14 is rotating and (ii) generate a track period measurement signal 380. In an example, the track period measurement signal 380 may be to an extent similar to the TE signal of FIG. 2B. In an example, the track period measurement signal 380 may be used to measure a period of track crossing of the tracks of the optical disc 14 (e.g., similar to the TE signal of FIG. 2B).

In an embodiment, the eccentricity measurement module 42 further comprises a speed determination module 314 configured to receive the track period measurement signal 380, and generate a speed signal 382. The speed signal 382 indicates a track crossing speed of the optical disc 14, e.g., with which the tracks of the optical disc 14 crosses the lens 26 (i.e., crosses the focal point of the light beam 50 while the optical disc 14 is rotating), when viewed from the lens 26. In an embodiment, for a given time, the speed signal 382 is generated by taking a reciprocal of a period between the zero crossings of the track period measurement signal 380 at that time.

The eccentricity measurement module 42 also comprises a low pass filter 318a configured to receive the track period measurement signal 380 and provide an output to an output module 342. The eccentricity measurement module 42 also comprises a band pass filter 326 configured to receive the track period measurement signal 380 and provide an output to a saturation module 330 of the eccentricity measurement module 42. The saturation module 330 generates a band pass filtered speed signal 384, which is received by a multiplication module 334 of the eccentricity measurement module 42. The multiplication module 334 also received an injector signal 386a, and multiplies the injector signal 386a with the band pass filtered speed signal 384 to generate a multiplication signal 388. The multiplication signal 388 is filtered by a low pass filter 318b to generate a sign detection signal 390. A comparison module 338 compares the sign detection signal 390 with a threshold (e.g., which is equal to zero). The output module 342 receives (i) the output of the comparison module 338 and (ii) the output of the low pass filter 318a, and generates an eccentricity signal 346. The eccentricity signal 346 provides a magnitude and a sign of eccentricity of the optical disc 14 during the rotation of the optical disc 14.

The eccentricity measurement module 42 also comprises an injector signal generation module 322 configured to generate the injector signal 386a and another injector signal 386b. In an embodiment, the injector signal 386b is received by the lens position control module 38, based on which the lens position control module 38 excites the actuators 34a and 34b, to oscillate the lens 26 at a sinusoidal manner with a given frequency (e.g., which is equal to the frequency of the injector signal 386b).

The injector signal generation module 322 comprises a digital time oscillator module 360 configured to generate, for example, a saw tooth wave having a predetermined frequency (or any other appropriate digital signal at the predetermined frequency). A sine table 368a of the injector signal generation module 322 is configured to receive the output of the digital time oscillator module 360, after addition of a signal that is a scaled version (e.g., scaled by a constant K) of the track period measurement signal 380. The sine table 368a is configured to generate the injector signal 386a, which is, for example, a sinusoidal waveform of the predetermined frequency. A sine table 368b of the injector signal generation module 322 is configured to receive the output of the digital time oscillator module 360, and generate the injector signal 386b.

In an embodiment, the eccentricity measurement module 42 generates the injector signal 386b having a frequency and amplitude, based on which the lens position control module 38 activates the actuators 34a and 34b to excite or oscillate the lens 26. That is, the injector signal 386b is transformed to an oscillating motion of the lens 26 by the lens position control module 38 and the actuators 34a and 34b.

In an embodiment, an amplitude of the injector signal 386a (e.g., which corresponds to an amplitude by which the lens 26 oscillates) is a fraction of a pitch of the tracks of the optical disc 14 (i.e., an amplitude that is substantially less than the track pitch of the optical disc 14). In an embodiment, the frequency of the injector signals 386a and 386b is substantially higher than a frequency with which the optical disc 14 rotates. In an example, the frequency of the injector signals 386a and 386b is about 1 kilo Hertz (KHz).

As previously stated, the digital time oscillator module 360 generates the saw tooth wave (or any other appropriate periodic digital signal) having a predetermined frequency (e.g., which is the frequency of the injector signals 386a and 386b). In an embodiment, to compensate for a delay in measurement, attenuation and/or digital sampling in the various components of the eccentricity measurement module 42, a scaled component of the track period measurement signal 380 (e.g., scaled by the factor "K" in FIG. 3) is added to the output of the digital time oscillator module 360, while generating the injector signal 386a (although in another embodiment, no such scaled version of the track period measurement signal 380 is added to the output of the digital time oscillator module 360, while generating the injector signal 386a).

Example Operation of the Eccentricity Measurement Module 42 of the System 10

Figure 4A:
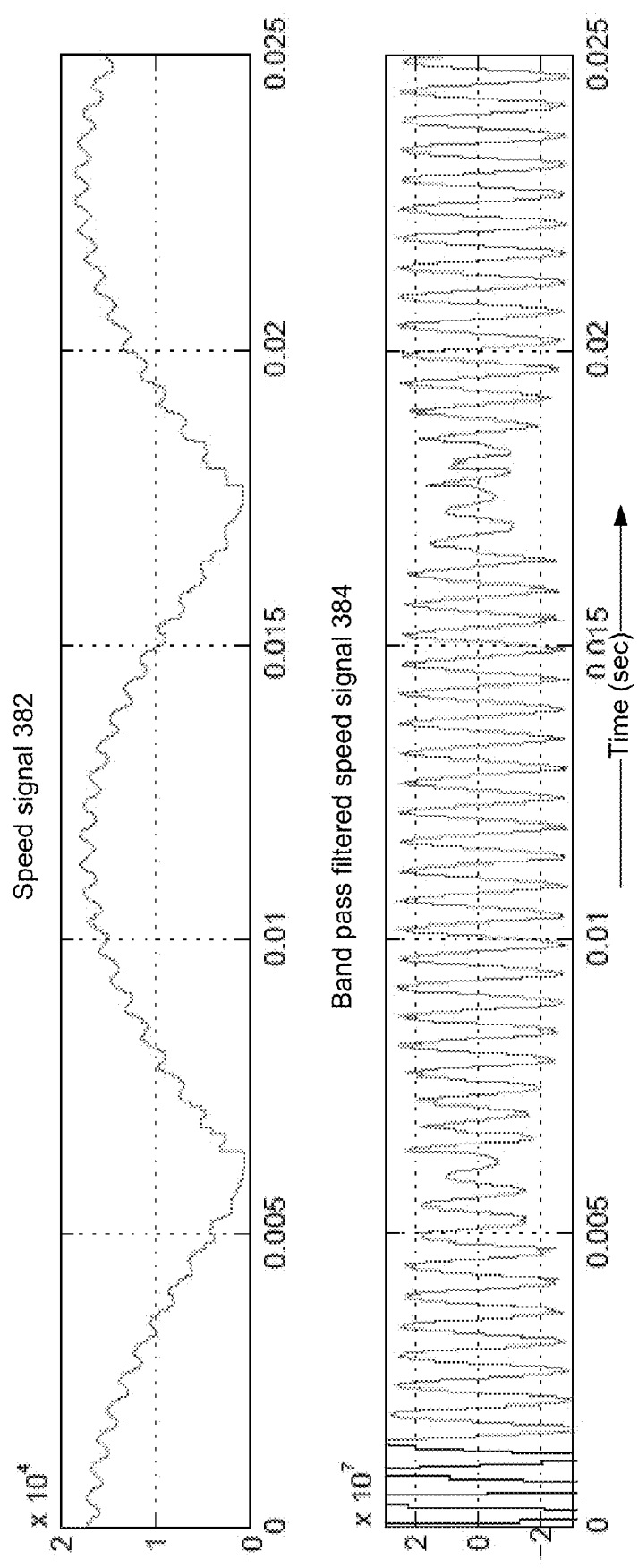
FIGS. 4A-4C illustrate various signals generated by the eccentricity measurement module of FIG. 3.

FIG. 4a illustrates the speed signal 382 and the band pass filtered speed signal 384 generated by the eccentricity measurement module 42. The speed signal 382 is generated based on the track period measurement signal 380. As previously discussed, the track period measurement signal 380 provides an indication of a magnitude of the speed signal 382, but does not provide a sign of the speed signal 382. Accordingly, unlike FIG. 2B (where an actual speed signal was illustrated as a sinusoidal waveform having positive and negative signals), the speed signal 382 of FIG. 4A is somewhat similar to a rectified sign wave. Furthermore, due to the oscillation of the lens 26 based on the injector signal 386b, the speed signal 382 has ripples in it. For example, the speed signal 382 is approximately a combination of (i) a low frequency rectified sine wave (which represents the speed of track crossing of the tracks of the optical disc 14 due to eccentricity) and (ii) a high frequency sine wave (which represents the speed of track crossing due to the oscillation of the lens 26, based on the injector signal 386b).

The band pass filter 326 filters the low frequency component of the speed signal 382, and the output of the band pass filter 326 mainly includes the high frequency component of the speed signal 382, which represents the track crossing speed due to the oscillation of the lens 26 by the injector signal 386b. The saturation module 330 eliminates any spike in the output of the band pass filter 326, and generates the band pass filtered speed signal 384, which is also illustrated in FIG. 4A. As discussed, the band pass filtered speed signal 384 comprises the high frequency component of the speed signal 382, which represents the track crossing speed due to the oscillation of the lens 26 by the injector signal 386b.

Figure 4B:
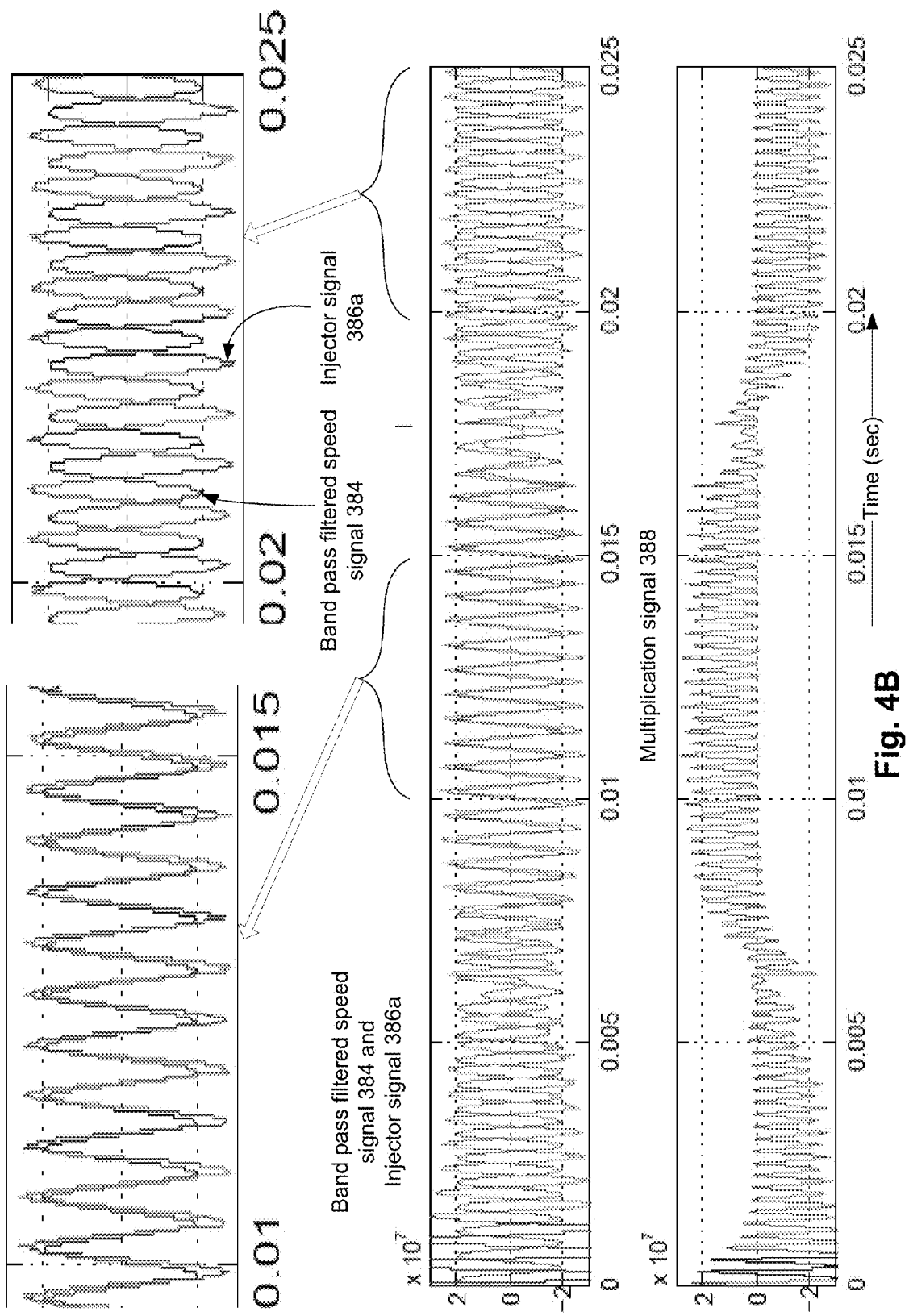

FIG. 4B illustrates (i) two inputs to the multiplication module 334 (i.e., the band pass filtered speed signal 384 and the injector signal 386a) and (ii) the output of the multiplication module 334 (i.e., the sign detection signal 390). For example, the top graph of FIG. 4B illustrates both the band pass filtered speed signal 384 and the injector signal 386a, which forms the inputs to the multiplication module 334. Also illustrated are magnified versions of the top graph including the band pass filtered speed signal 384 and the injector signal 386a.

As illustrated in FIG. 4B, for a first duration (e.g., between time 0.01 to 0.015), the band pass filtered speed signal 384 and the injector signal 386a are almost in phase; and for a second duration (e.g., between time 0.02 to 0.025), the band pass filtered speed signal 384 and the injector signal 386a are almost opposite in phase, as more clearly illustrated in the magnified versions of the top graph.

The multiplication signal 388 varies (e.g., is either positive or negative), e.g., based on a phase relationship of the band pass filtered speed signal 384 and the injector signal 386a. For example, the multiplication signal 388 is positive when the phases of the band pass filtered speed signal 384 and the injector signal 386a are the same or near similar, and the multiplication signal 388 is negative when the phases of the band pass filtered speed signal 384 and the injector signal 386a are opposite or differs considerably, as illustrated in FIG. 4B.

Figure 4C:
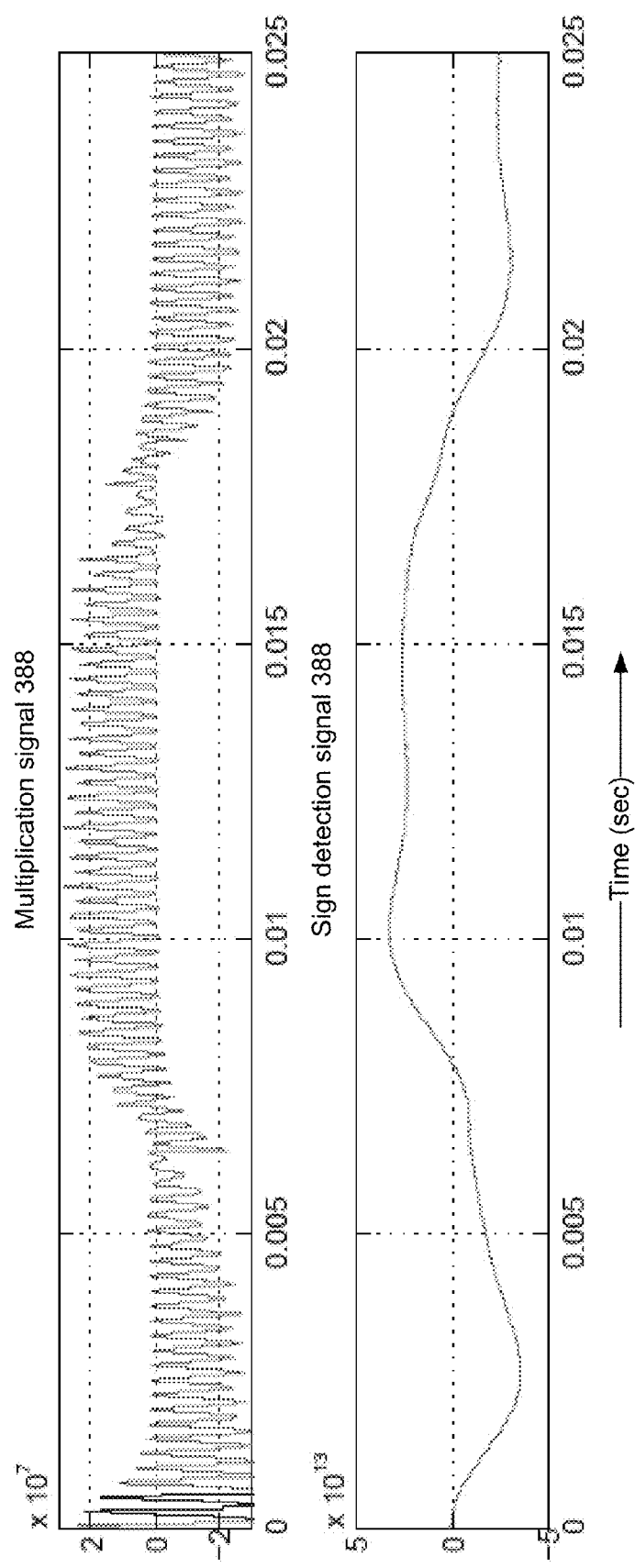

FIG. 4C illustrated in the multiplication signal 388 and the sign detection signal 390. The multiplication signal 388 has a high frequency component and a low frequency component, where the low frequency component is an indication of a sign of the speed signal 382. The low pass filter 318b filters the high frequency component of the multiplication signal 388, such that the sign detection signal 390 includes the low frequency component of the multiplication signal 388. Thus, the sign detection signal 390 provides an indication of the sign of the track crossing speed. For example, while the sign detection signal 390 is positive, the track crossing speed is also positive; and while the sign detection signal 390 is negative, the track crossing speed is also negative. The comparison module 338 compares the sign detection signal 390 with a threshold (e.g., which is equal to zero), and outputs an estimated sign of the track crossing speed.

Put differently, the speed signal 382 provides an indication of an amplitude of the track crossing speed of the optical disc 14, while the output of the comparison module 338 provides a sign of the track crossing speed.

For example, referring to FIGS. 2A and 2B, at points B, C, D and E of the trajectory 214, the track crossing speed is positive; and at points F, G, H, I and J of the trajectory 214, the track crossing speed is negative. The output of the comparison module 338 provides an indication of such a positive or negative value of the track crossing speed.

The output module 342 receives the output of the comparison module 338. Also, the low pass filter 318a filters out the high frequency component of the speed signal 382, such that the output of the low pass filter 318a represents the amplitude of the track crossing speed of the optical disc 14 due to eccentricity (and not due to the oscillation of the lens in response to the injector signal 386b). Thus, the output of the low pass filter 318a and the sign detection signal 390 respectively indicates (i) the amplitude and (ii) the sign of the component of the track crossing speed that is due to the eccentricity of the optical disc 14. Based on the output of the low pass filter 318a and the sign detection signal 390, the output module 342 estimates an amplitude and a phase of the eccentricity signal 346 (which is a measure of the eccentricity of the optical disc 14).

As previously discussed, in a conventional optical disc drive system, an amplitude and a phase of an eccentricity of an optical disc may be estimated, for example, using a track error signal and a signal (e.g., a sum signal) from a diode detector in an optical pick up unit of the optical disc drive system. However, a modulation of the signal from the diode detector may be low, and the signal from the diode detector may be easily affected by, for example, scratches, birefringence or finger prints in the optical disc. Accordingly, estimating the phase of the eccentricity in the conventional optical disc drive system, using the track error signal and the signal from the diode detector, may be prone to errors. In contrast, estimating the phase and amplitude of eccentricity, using the eccentricity measurement module 42 of the system 10, is more robust. For example, the eccentricity measurement module 42 estimates the phase and the amplitude of the eccentricity by measuring the track period measurement signal 380 (and by oscillating the lens 26), but does not rely on any signal from any diode detector in an optical pick up unit of the system 10. Accordingly, estimating the phase of the eccentricity, using the eccentricity measurement module 42 of the system 10, is not affected by scratches, birefringence or finger prints (or other inaccuracies) in the optical disc 14.

Example Parameters of Various Components and Signals of the Eccentricity Measurement Module 42 of the System 10

As previously discussed, in an embodiment, the amplitude of the injector signal 386a (e.g., which corresponds to an amplitude by which the lens 26 oscillates) is a fraction of a pitch of the tracks of the optical disc 14 (i.e., an amplitude that is substantially less than the track pitch of the optical disc 14). In an embodiment, the frequency of the injector signals 386a and 386b is substantially higher than a frequency with which the optical disc 14 rotates. In an example, the frequency of the injector signals 386a and 386b is about 1 kilo Hertz (KHz).

In an example, the saturation module 330 uses saturation values of about −25e-6 and +25e-6, i.e., signals above or below these values are saturated by the saturation module 330. In an example, the scaling constant K is equal to about −13e-6, and is used to compensate for a phase delay in the generation of the speed signal 382.

In an example, a transfer function of the low pass filters (LPF) 318a and 318b is given by $$LPF = 3 \frac{z^2 - 2 \cdot z \cdot \cos(2pi \cdot fw \cdot Ts) + 1}{z^2 - 2 \cdot z \cdot Rw \cdot \cos(2pi \cdot flpf \cdot Ts) + Rp2^2},$$  Equation (1)

and a transfer function of the band pass filter (BPF) 326 is given by $$BPF = \frac{z^2 - 2 \cdot z \cdot \cos(2pi \cdot 2 \cdot RPS \cdot Ts) + 1}{z^2 - 2 \cdot z \cdot Rlpf \cdot \cos(2pi \cdot fw \cdot Ts) + Rp1^2},$$  Equation (2)

where Rw is a low pass filter damping and has an example value of about 0.995; RPS is revolutions per second of the optical disc 14 and, for example, is equal to about 40; fw is an wobble frequency of the low pass filter and is equal to, for example, 1000 Hz (i.e., is equal to the frequency of the injector signals 386a and 396b); Rlpf is a damping of the band pass filter 326 and has an example value of about 0.97; Ts is the sample period; and flpf is a low pass filter cut-off frequency and has an example value of 200 Hz.

Figure 5:
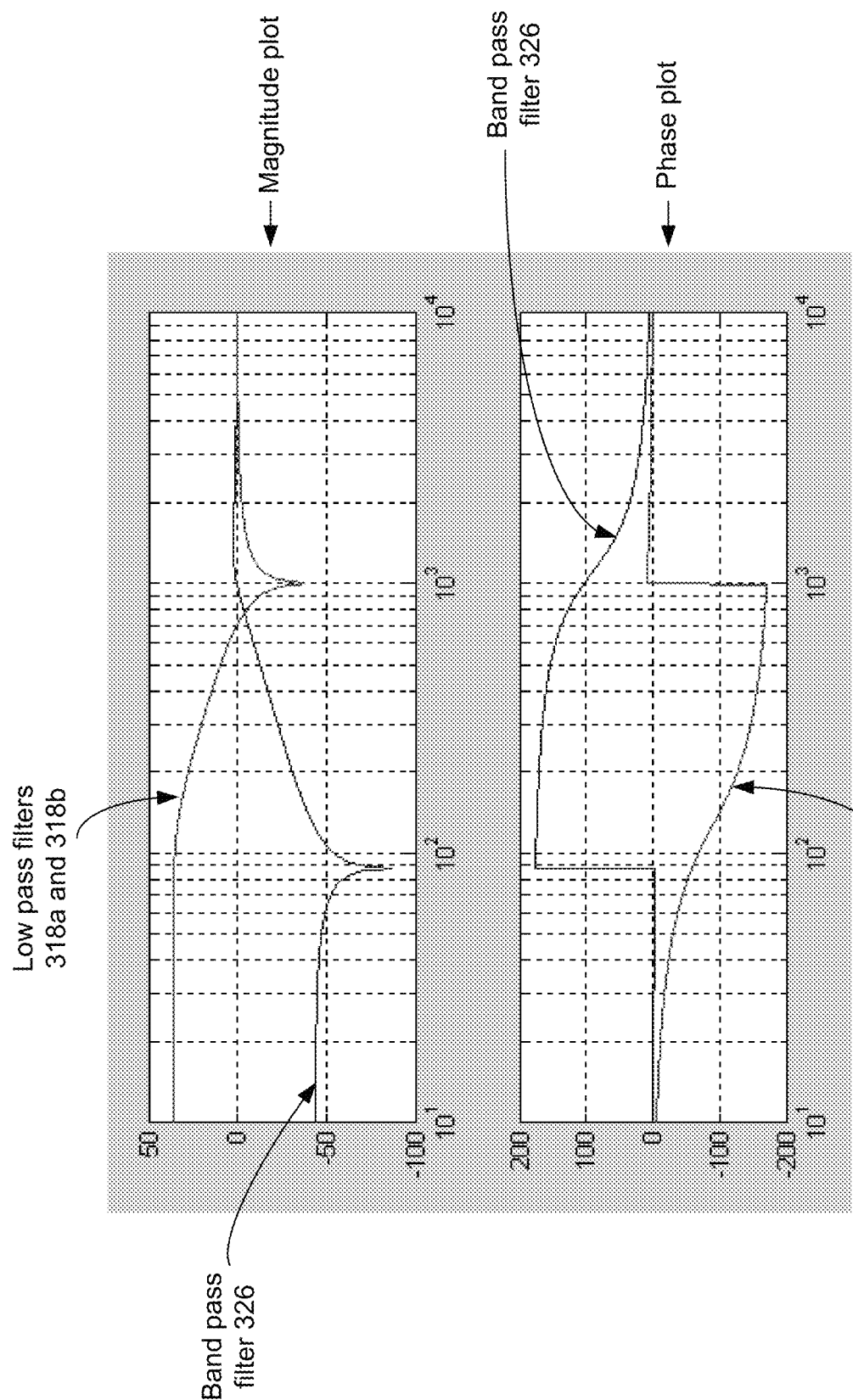
FIG. 5 illustrates bode plots for various filters of the eccentricity measurement module of FIG. 3.

FIG. 5 illustrates bode plots for the (i) low pass filters 318a and 318b (both the low pass filters 318a and 318b have substantially similar transfer functions) and (ii) the band pass filter 326. The bode plot of FIG. 5 is based on Equations 1 and 2. The top graph in FIG. 5 illustrates the magnitude plot and the bottom graph illustrates the phase plot. As illustrated in FIG. 5, the low pass filters 318a and 318b removes the 1 KHz component from its input, i.e., the component associated with the oscillation of the lens 26 at 1 KHz frequency. On the other hand, the band pass filter allows the 1 KHz component associated with the oscillation of the lens 26 at 1 KHz frequency, but removes the component of the input that is due to the low frequency eccentricity of the optical disc 14.

Example method of Operation of the Eccentricity Measurement Module 42 of the System 10

Figure 6:
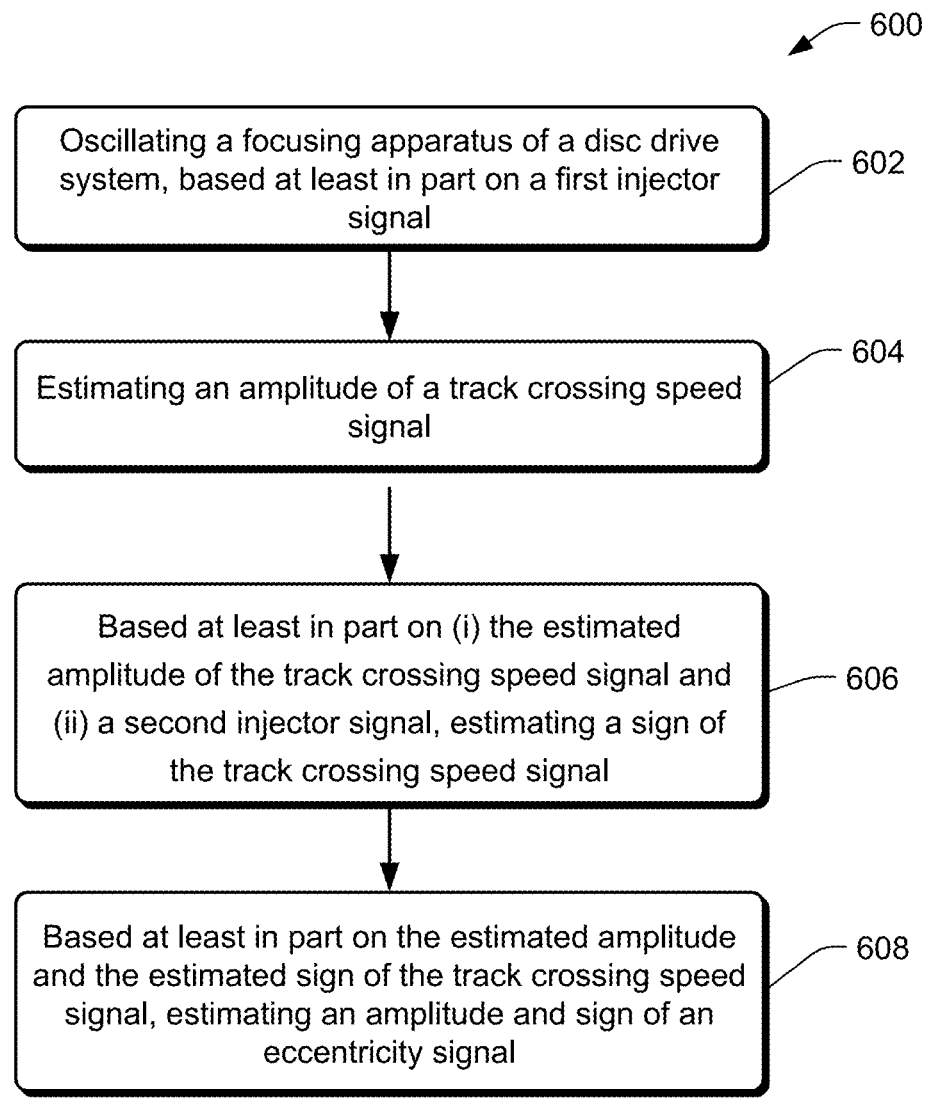
FIG. 6 illustrates an example method for operating the eccentricity measurement module of FIG. 3.

FIG. 6 illustrates an example method 600 for operating the eccentricity measurement module 42 of FIG. 3. At 602, a lens position control module (e.g., the lens position control module 38) oscillates a focusing apparatus (e.g., the lens 26) of a disc drive system (e.g., the system 10), based at least in part on a first injector signal (e.g., injector signal 386b). At 604, a speed determination module (e.g., the speed determination module 314) estimates an amplitude of a track crossing speed signal (e.g., the track crossing speed signal 382). At 606, based at least in part on (i) the estimated amplitude of the track crossing speed signal and (ii) a second injector signal, the eccentricity measurement module (e.g., the multiplication module 334, the low pass filter 318b and/or the comparison module 338) estimates a sign of the track crossing speed signal. At 608, based at least in part on the estimated amplitude and the estimated sign of the track crossing speed signal, the eccentricity measurement module (e.g., the output module 342) estimates an amplitude and sign of an eccentricity signal (e.g., the eccentricity signal 346).

In accordance with various embodiments, an article of manufacture may be provided that includes a storage medium having instructions stored thereon that, if executed, result in the operations described herein with respect to the method 600 of FIG. 6 (and/or various other operations discussed in the present disclosure). In an embodiment, the storage medium comprises some type of non-transitory memory (not shown). In accordance with various embodiments, the article of manufacture may be a computer-readable medium such as, for example, software or firmware.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although specific embodiments have been illustrated and described herein, it is noted that a wide variety of alternate and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. A method for operating a disc drive system, the method comprising:
    based at least in part on a first injector signal, oscillating a focusing apparatus of the disc drive system;
    while oscillating the focusing apparatus of the disc drive system and rotating a disc placed within the disc drive system, estimating an amplitude of a track crossing speed signal;
    generating a second injector signal having a frequency that is substantially the same as a frequency of the first injector signal;
    based at least in part on the estimated amplitude of the track crossing speed signal and the second injector signal, estimating a sign of the track crossing speed signal, wherein the track crossing speed signal comprises a low frequency component that is substantially due to the eccentricity of the disc and a high frequency component that is substantially due to the oscillation of the focusing apparatus;

filtering the track crossing speed signal using a band pass filter such that an output of the band pass filter substantially comprises the high frequency component of the track crossing speed signal;

multiplying the output of the band pass filter with the second injector signal to generate a multiplication signal; and filtering the multiplication signal using a low pass filter to generate a sign detection signal, wherein the sign detection signal provides an indication of the sign of the track crossing speed signal.

2. The method of claim 1, further comprising:

based at least in part on the estimated amplitude and the estimated sign of the track crossing speed signal, estimating an eccentricity signal, wherein the eccentricity signal measures an eccentricity of the disc while the disc rotates within the disc drive system.

3. The method of claim 2, further comprising:

in response to estimating the eccentricity signal, performing an acquisition and tracking of a track of the disc by the focusing apparatus.

4. The method of claim 1, wherein oscillating the focusing apparatus of the disc drive system further comprises:

oscillating the focusing apparatus of the disc drive system using the first injector signal such that the frequency of the first injector signal is substantially higher than a frequency of rotation of the disc within the disc drive system.

5. The method of claim 1, wherein the track crossing speed signal refers to a speed with which tracks of the disc cross the focusing apparatus while the disc is rotating within the disc drive system, when viewed from the focusing apparatus.

6. The method of claim 1, wherein the track crossing speed signal refers to a speed with which tracks of the disc cross a focal point of a light beam generated by the focusing apparatus while the disc is rotating within the disc drive system, when viewed from the focusing apparatus.

7. A method for operating a disc drive system, the method comprising:

based at least in part on a first injector signal, oscillating a focusing apparatus of the disc drive system;

while oscillating the focusing apparatus of the disc drive system and rotating a disc placed within the disc drive system, estimating an amplitude of a track crossing speed signal;

generating a second injector signal having a frequency that is substantially the same as a frequency of the first injector signal;

based at least in part on the estimated amplitude of the track crossing speed signal and the second injector signal, estimating a sign of the track crossing speed signal, wherein the track crossing speed signal comprises a low frequency component that is substantially due to the eccentricity of the disc and a high frequency component that is substantially due to the oscillation of the focusing apparatus;

filtering the track crossing speed signal using a band pass filter such that an output of the band pass filter substantially comprises the high frequency component of the track crossing speed signal;

filtering the track crossing speed signal using a low pass filter such that an output of the low pass filter substantially comprises the low frequency component of the track crossing speed signal; and based at least in part on the output of the low pass filter and the estimated sign of the track crossing speed signal, determining an eccentricity signal, wherein the eccentricity signal measures an eccentricity of the disc while the disc rotates within the disc drive system.

8. The method of claim 7, wherein the estimated sign of the track crossing speed signal is determined prior to reading from or writing to a track of the disc.

9. The method of claim 7, further comprising:

generating, using a digital time oscillator, a digital signal having a periodicity; and based at least in part on the digital signal having the periodicity, generating the first injector signal, wherein generating the second injector signal further comprises generating the second injector signal based at least in part on the digital signal having the periodicity and the track period measurement signal.

10. The method of claim 7, wherein estimating the amplitude of the track crossing speed signal further comprises:

estimating a track period measurement signal, wherein the track period measurement signal indicates an error associated with tracking a plurality of tracks of the disc by the focusing apparatus of the disc drive system; and based at least in part on the track period measurement signal, estimating the amplitude of the track crossing speed signal.

11. The method of claim 7, wherein:

the disc drive system is an optical disc drive;

the disc is an optical disc; and the focusing apparatus is a lens.

12. A controller of a disc drive system, the controller comprising:

a position control module configured to oscillate a focusing apparatus of the disc drive system, based at least in part on a first injector signal; and an eccentricity measurement module comprising a speed determination module configured to estimate an amplitude of a track crossing speed signal while the focusing apparatus is being oscillated and a disc placed within the disc drive system is being rotated, an injector signal generation module configured to generate the first injector signal and a second injector signal, wherein the second injector signal has a frequency that is substantially the same as a frequency of the first injector signal, wherein the eccentricity measurement module is configured to, based at least in part on the estimated amplitude of the track crossing speed signal and the second injector signal, estimate a sign of the track crossing speed signal, a multiplication module configured to receive a processed version of the amplitude of the track crossing speed signal and the second injector signal, and generate a multiplication signal that is indicative of a sign of the track crossing speed signal, a low pass filter configured to receive the multiplication signal and attenuate a high frequency component of the multiplication signal to generate a sign detection signal, and a comparison module configured to compare the sign detection signal with zero, wherein an output of the comparison module provides an estimate of the sign of the track crossing speed signal.

13. The controller of claim 12, wherein the eccentricity measurement module further comprises an output module configured to:

receive another processed version of the amplitude of the track crossing speed signal and the output of the comparison module; and estimate an amplitude and a phase of an eccentricity signal that is indicative of an eccentricity in the rotation of the disc.

14. The controller of claim 12, wherein the position control module is configured to oscillate the focusing apparatus:
- with a frequency that is substantially higher than a frequency of rotation of the disc within the disc drive system; and
- with an amplitude that is lower than a pitch of a track of the disc.

15. A controller of a disc drive system, the controller comprising:
- a position control module configured to oscillate a focusing apparatus of the disc drive system, based at least in part on a first injector signal; and
- an eccentricity measurement module comprising
  - a speed determination module configured to estimate an amplitude of a track crossing speed signal while the focusing apparatus is being oscillated and a disc placed within the disc drive system is being rotated, and
  - an injector signal generation module configured to generate the first injector signal and a second injector signal, wherein the second injector signal has a frequency that is substantially the same as a frequency of the first injector signal, wherein the eccentricity measurement module is configured to, based at least in part on the estimated amplitude of the track crossing speed signal and the second injector signal, estimate a sign of the track crossing speed signal,
- wherein the track crossing speed signal comprises (i) a low frequency component that is substantially due to the eccentricity of the disc, and (ii) a high frequency component that is substantially due to the oscillation of the focusing apparatus, and
- wherein the eccentricity measurement module further comprises a band pass filter configured to filter the track crossing speed signal such that an output of the band pass filter substantially comprises the high frequency component of the track crossing speed signal.

16. The controller of claim 15, wherein:
the disc drive system is an optical disc drive;
the disc is an optical disc; and
the focusing apparatus is a lens.

17. A disc drive system comprising:
- a focusing apparatus;
- a position control module configured to oscillate the focusing apparatus of the disc drive system, based at least in part on a first injector signal; and
- an eccentricity measurement module comprising:
  - a speed determination module configured to estimate an amplitude of a track crossing speed signal while the focusing apparatus is being oscillated and a disc placed within the disc drive system is being rotated,
  - an injector signal generation module configured to generate the first injector signal and a second injector signal, wherein the second injector signal has a frequency that is substantially the same as a frequency of the first injector signal, and
  - a multiplication module configured to:
    - receive a processed version of the amplitude of the track crossing speed signal and the second injector signal, and
    - generate a multiplication signal that is indicative of a sign of the track crossing speed signal.

18. The disc drive system of claim 17, wherein the eccentricity measurement module further comprises:
- a low pass filter configured to receive the multiplication signal and attenuate a high frequency component of the multiplication signal to generate a sign detection signal;
- a comparison module configured to compare the sign detection signal with zero, wherein an output of the comparison module provides an estimate of the sign of the track crossing speed signal; and
- an output module configured to, based at least in part on the estimated amplitude and the estimated sign of the track crossing speed signal, estimate an eccentricity signal, wherein the eccentricity signal measures an eccentricity of the disc while the disc rotates within the disc drive system.

19. The disc drive system of claim 17, wherein in response to estimating the eccentricity signal, the focusing apparatus performs an acquisition and tracking of a track of the disc.

* * * * *